United States Patent [19]

Chi et al.

[11] Patent Number: 4,460,639

[45] Date of Patent: Jul. 17, 1984

[54] FIBER REINFORCED GLASS MATRIX COMPOSITES

[75] Inventors: Frank K. Chi; Gary L. Stark, both of Midland, Mich.

[73] Assignee: Dow Corning Corporation, Midland, Mich.

[21] Appl. No.: 482,685

[22] Filed: Apr. 6, 1983

[51] Int. Cl.$^3$ ............................................. D03D 3/00
[52] U.S. Cl. ..................................... 428/224; 156/89;
156/155; 156/296; 156/307.5; 156/307.7;
156/329; 427/387; 428/232; 428/245; 428/260;
428/269; 428/290; 428/294; 428/367; 428/391;
428/408; 428/447; 428/902
[58] Field of Search .............. 156/89, 155, 296, 307.3,
156/307.7, 329, 307.5; 428/224, 391, 392, 367,
408, 446, 902, 232, 245, 260, 266, 269, 272, 290,
294, 447; 427/387

[56] References Cited

PUBLICATIONS

S. R. Levitt, Journal of Materials Science 8 (1973) 793–806 "High–Strength Graphite Fiber/Lithium Aluminosilicate Composites".

J. J. Brennan, United Tech. Research Center Aug. 15, 1979, Annual Report, Report R74-914401-2 "Program to Study SiC Fiber Renforced Glass Matrix Composites".

J. F. Bacon, et al., United Tech. Research Center, Jun. 1978, Report N79-11126 "Research on Graphite Reinforced Glass Matrix Composites".

*Primary Examiner*—James J. Bell
*Attorney, Agent, or Firm*—Richard A. Kaba

[57] ABSTRACT

What is disclosed is a method of preparing fiber reinforced glass composites from high modulus fibers and resin sols of organosilsesquioxanes, metal oxides, and metal alkoxides. The composites are obtained by firing a partially cured, pressed, and post-cured prepreg to an elevated temperature in an inert atmosphere. A simple, low temperature laminating procedure is used in the preparation of these composites in place of the standard hot pressing technique.

71 Claims, No Drawings

FIBER REINFORCED GLASS MATRIX COMPOSITES

BACKGROUND OF INVENTION

This invention deals with new and novel fiber reinforced glass composites. Ceramics as high performance engineering materials have been more of a novelty than a commercially successful technical venture owing to the many disadvantages associated with the manufacture of these types of materials.

In order for ceramics to find wider applicability as engineering materials, major improvements in strength and toughness, i.e. improved resistance to thermal and mechanical shock, are required. A great potential for ceramics as high performance engineering materials exists in many applications provided that ceramics which are not intrinsically flaw sensitive or brittle can be produced with relative ease. For example, monolithic silicon carbides and silicon nitrides with modulus of rupture (MOR) greater than 50,000 psi have been prepared.

Several attempts at preparing better ceramic composites have been disclosed. One such attempt is disclosed in an article by S. R. Levitt entitled "High-strength graphite fiber/lithium aluminosilicate composites", J. Mat. Sci., 8, 793(1973). Levitt discloses that ceramic matrix compositions having the composition $Li_2O.Al_2O_3.nSiO_2$ wherein n has a value of 3, 4 and 8, have been developed with a high volume fraction of undirectionally aligned graphite fibers.

In a report prepared by J. J. Brennan, "Program to Study SiC Fiber Reinforced Glass Matrix Composites", UTRC Annual Report R79-914401-2 (1979), matrix compositions from magnesium aluminosilicate as well as compositions of lithium aluminosilicate in combination with silicon carbide fibers were employed to prepare composites. Brennan reports that there were fabrication difficulties in this system due to lack of wetting and bonding between the fiber and matrix.

Finally, a NASA Contract Report, "Research on Graphite Reinforced Glass Matrix Composites", J. F. Bacom, et al. NTIS Report N79-11126 (1978), discloses a combination of graphite fibers and borosilicate glass to give composites.

All of these approaches to engineering materials require arduous hot-pressing techniques. The hot-pressing technique generally requires temperatures of greater than 1500° C. and pressures of 1000–5000 psi.

The present invention overcomes the disadvantages of the prior art methods because the composites of this invention prepared from carbon or silicon carbide fibers and sols, as described herein, require only a simple laminating process without using a hot-press technique. Further, composites with excellent physical properties can be obtained.

THE INVENTION

According to the present invention fiber reinforced glass composites can be obtained by firing a partially cured, pressed and post-cured prepreg to an elevated temperature, in an inert atmosphere such as argon, nitrogen, helium, or under a vacuum.

The fiber reinforced glass composites are prepared by a method which comprises (A) impregnating high modulus fibers with a resin sol, which resin sol is selected from the group consisting essentially of (i) a sol of an organosilsesquioxane having the average formula $$[C_6H_5SiO_{3/2}][RSiO_{3/2}]$$

wherein $C_6H_5SiO_{3/2}$ is present in said organosilsesquioxane in the amount of 5 to 100 percent by weight and $RSiO_{3/2}$ is present in the amount of 0 to 95 percent by weight based on the total weight of organosilsesquioxane present, and where R is an alkyl radical containing from 1 to 4 carbon atoms;

(ii) a mixture of a sol of the organosilsesquioxane from (i) and a colloidal metal oxide, or a mixture of colloidal metal oxides, selected from the group consisting of $SiO_2$, $Al_2O_3$, $ZrO_2$, $TiO_2$, $SnO_2$, $ZrSiO_4$, $B_2O_3$, $La_2O_3$, and $Sb_2O_5$; wherein $C_6H_5SiO_{3/2}$ is present in said organosilsesquioxane in the amount of 5 to 90 percent by weight and $RSiO_{3/2}$ is present in the amount of 10 to 95 percent by weight based on the total weight of organosilsesquioxane present; and (iii) a mixture of a sol of the organosilsesquioxane from (i) and a metal alkoxide, or mixture of metal alkoxides, having the general formula $$M(OR')_x$$

wherein M is a metal atom, R' is an alkyl radical containing from 1 to 4 carbon atoms, and x is 3 or 4, wherein said metal alkoxide hydrolyzes and condenses in water; wherein $C_6H_5SiO_{3/2}$ is present in the amount of 5 to 90 percent by weight and $RSiO_{3/2}$ is present in the amount of 10 to 95 percent by weight based on the total weight of organosilsesquioxane present;

(B) forming a prepreg by drying the product from (A);

(C) heating the prepreg of (B) at an elevated temperature;

(D) pressing the prepreg from (C) at a temperature not greater than about 300° C.;

(E) curing the pressed prepreg from (D) at a temperature not greater than about 300° C. for a time sufficient to insure complete or nearly complete crosslinking in the prepreg;

(F) slowly firing the pressed and cured prepreg from (E) to a temperature of at least 1000° C. in an inert atmosphere or vacuum until a fiber reinforced glass composite is obtained; and (G) cooling the fiber reinforced glass composite.

For purposes of this invention, the fibers most useful herein are high modulus silicon carbide and carbon fibers. Examples of such fibers include carbon fibers containing 6000 filaments per tow or strand available from the Celanese Corporation, 86 Morris Avenue, Summit, N.J., U.S.A. under the trademark "Celion" and silicon carbide fibers available from Nippon Carbon Company, Ltd., Tokyo, Japan under the trademark "Nicalon". Naturally, other high modulus fibers, such as, for example, a alumina-boria-silica fiber available from Minnesota Minning and Manufacturing Company, St. Paul, Minn., U.S.A. under the tradename "Nextel 312", can be employed in this invention. It is preferred that the fibers used in the composites are essentially unidirectional and continuous fibers or woven fabrics. Unidirectional or woven fibers in the composite tend to lend greater strength to the composite. By "essentially unidirectional and continuous" it is meant that the fibers in the composite are generally in a parallel alignment and that the individual fibers extend through the composite in a generally unbroken manner. Generally, the fibers are treated prior to impregnation to remove any size or surface treatment used by the manufacturer. For example, the fibers can be subjected to an open flame treatment to burn the size away. Quite often, the fibers are soaked in solvents to remove such coatings. The fibers may be then pretreated to allow the sols to wet the fibers much better. This pretreatment allows better adhesion of the matrix with the fibers of the composite which leads to better physical properties in the final composite product. Typically, the fibers are treated with organofunctional silanes or organofunctional silanes in conjunction with organic resins. These types of materials are known for use on glass cloth composites and the like. For example, 3-glycidoxypropyltrimethoxysilane (manufactured by Dow Corning Corporation, Midland, Mich., U.S.A.), alone or combined with a melamine resin, trademark Cymel 303, (manufactured by American Cyanamid, Wayne, N.J., U.S.A.) make an excellent pretreatment for the fibers in this invention.

For purposes of this invention, the words "sol" and "solution" will be used interchangeably, recognizing that solutions and sols are different in physical characteristics. If one needs to known whether or not the composition is a sol or a solution, that fact can be easily noted by subjecting the liquid composition to a simple test which includes placing a glass vessel of the composition between one's line of vision and a strong light source. If the composition shows a bluish cast, then it is a true sol. This is known as the Tyndall effect. If the composition is clear, then it is a true solution.

The sols are obtained by hydrolyzing the appropriate alkoxysilane monomers. For purposes of this invention, the most useful alkoxysilanes are $C_6H_5Si(OCH_3)_3$ and $RSi(OCH_3)_3$ where R is an alkyl radical containing 1 to 4 carbon atoms. The most preferred $RSi(OCH_3)_3$ is $CH_3Si(OCH_3)_3$. These silanes are hydrolyzed by conventional means by placing the silanes in a reaction vessel, adding a small amount of acid such as an organic carboxylic acid, such as acetic acid, or a mineral acid such as hydrochloric acid, and then adding sufficient water to at least hydrolyze all of the alkoxy groups on silicon. The alcohol by-product in the hydrolysis reaction serves as part of the diluent for the sol. Any manner of combining the silanes, water and acid is useable in this invention as long as the silsesquioxane or silsesquioxanes formed by the hydrolysis of the alkoxy groups and condensation of the resultant silanol groups, does not gel.

Incorporation of $C_6H_5SiO_{3/2}$ in the organosilsesquioxane sols of this invention is required since the $C_6H_5SiO_{3/2}$ provides flowability in the resin during the molding or pressing step D. The minimum amount of $C_6H_5SiO_{3/2}$ required is about 5 weight percent based on the total weight of organosilsesquioxanes present. It is preferred, however, that the $C_6H_5SiO_{3/2}$ be present in amounts greater than or equal to 10 weight percent. This minimum $C_6H_5SiO_{3/2}$ requirement applies to all the sols (i), (ii), and (iii) used in this invention.

Therefore, for sol (i), $C_6H_5SiO_{3/2}$ is present in an amount ranging from 5 to 100 weight percent and $RSiO_{3/2}$ in an amount of 0 to 95 weight percent based on the total organosilsesquioxane weight. It is preferred, however, that $C_6H_5SiO_{3/2}$ be present at the 30 to 70 weight percent level and $RSiO_{3/2}$ at the 30 to 70 weight percent level. When $C_6H_5SiO_{3/2}$ is present at high levels (greater than about 95 weight percent) organic solvents may be needed to insure stability of the sol.

Also included in this invention are sols of organosilsesquioxanes mixed with colloidal metal oxides or mixtures of colloidal metal oxides. Such colloidal metal oxides useful in this invention include $SiO_2$, $Al_2O_3$, $ZrO_2$, $TiO_2$, $SnO_2$, $ZrSiO_4$, $B_2O_3$, $La_2O_3$ and $Sb_2O_5$.

These colloidal metal oxides are commercially available and, for the most part, have typical particle sizes of about 5-150 millimicrons, depending on the type of metal oxide in the sol. Examples include silica sols available from E. I. DuPont, Wilmington, Del., U.S.A. and Nalco Chemical Co., Oak Brook. Ill., U.S.A. under the tradenames "Ludox" and "Nalcoag", respectively. These materials can also be easily prepared by conventional techniques. (See Matijivic, Budnik and Meites, Journal of Colloid and Interface Science, 61:302-311 (1977)). There are a number of different methods of combining the organosilsesquioxanes and the colloidal metal oxides. For example, each alkoxysilane can be hydrolyzed separately and then the hydrolyzates can be combined with each other. The alkoxysilanes also can be combined in the proper ratios and cohydrolyzed. The colloidal metal oxides can be employed at any stage of the method as long as the hydrolysis of the alkoxysilanes, and subsequent condensation of the silanols formed, have not yielded a gel. For example, the colloidal metal oxides can be mixed with the alkoxysilanes ($CH_3Si(OCH_3)_3$ and $C_6H_5Si(OCH_3)_3$). The water present in the colloidal oxide hydrolyzes the alkoxysilanes yielding $CH_3SiO_{3/2}$, $C_6H_5SiO_{3/2}$ and by-produced methanol. The colloidal silica and the $CH_3SiO_{3/2}$ and $C_6H_5SiO_{3/2}$ hydrolyzates react to form a copolymeric material and form a sol.

The preferred colloidal oxides for use in this invention are $SiO_2$, $TiO_2$, $Al_2O_3$, $ZrO_2$ and $ZrSiO_4$ and mixtures thereof. Most preferred for this invention are silicon, aluminum and zirconium oxides.

Also included in this invention are sols of organosilsesquioxanes and metal oxides derived from metal alkoxides. The metal alkoxides useful in this invention are those having the general formula $M(OR')_x$ which are capable of hydrolyzing and condensing in water wherein M is any metal from a metal alkoxide and x is 3 or 4. R' in the above formula is an alkyl group of 1 to 4 carbon atoms. Thus, contemplated within the scope of this invention are such metal alkoxides as $Si(OR')_4$, $Ti(OR')_4$, $Al(OR')_3$, $Zr(OR')_4$ and $Sn(OR')_4$. Specifically, R' can be the methyl, ethyl, propyl or butyl radical. Preferred for this invention are the propoxy or butoxy materials. Most preferred are Ti(isopropoxy)$_4$, Al(isopropoxy)$_3$, Al(sec-butoxy)$_3$, Zr(n-butoxy)$_4$ and Zr(n-propoxy)$_4$.

These metal alkoxides are readily available in commerce and their preparation need not be discussed in detail.

When the metal alkoxides are used in this invention, they are generally combined with the alkoxysilanes discussed above and cohydrolyzed to give a condensable product. Thus, the alkoxysilane precursors for the silsesquioxanes of this invention can be combined with the metal alkoxides and cohydrolyzed or the alkoxysilane precursors can first be hydrolyzed and then mixed with the metal alkoxide which then causes the hydrolysis of the metal alkoxide. The hydrolyzates are then diluted if necessary or desired with water soluble or water miscible solvents. It is contemplated within the scope of this invention to hydrolyze the metal alkoxides by themselves and then add the hydrolyzate to the alkoxysilane precursors, causing the silane precursors to hydrolyze. Mixtures of the metal alkoxides or their hydrolyzates can be used in this invention.

The sols containing metal oxides or metal alkoxides also require greater than 5 weight percent, and preferable 10 weight percent or more, of $C_6H_5SiO_{3/2}$ present in the organosilsesquioxane, based on the total weight of the organosilsesquioxane, to insure flowability of the resin in the pressing step. Additionally, these sols require at least 10 weight percent of $RSiO_{3/2}$, where R is an alkyl with 1 to 4 carbon atoms, in the organosilsesquioxane. Sols prepared with less than about 10 weight percent $RSiO_{3/2}$ are not stable in the presence of the metal oxides or metal alkoxides added in sols (ii) and (iii). Therefore, for sols (ii) and (iii) the organosilsesquioxane should contain between 5 and 90 weight percent $C_6H_5SiO_{3/2}$ and between 10 and 95 weight percent $RSiO_{3/2}$ based on the total weight of the organosilsesquioxane. It is preferred however that the organosilsesquioxane used in sols (ii) and (iii) contain 30 to 70 weight percent of $C_6H_5SiO_{3/2}$ and 30 to 70 weight percent of $RSiO_{3/2}$.

For purposes of invention it is preferred that the hydrolysis reactions be carried out in the presence of from 1 to 200 equivalents of water for each equivalent of alkoxy in the mixture. It has been found that greater than 1 equivalent of water for each equivalent of alkoxy gives better sols, in that, the sols clear more rapidly, stay clear and are more stable. Moreover, even though only one equivalent of water is required for hydrolysis, it is obvious that in order to form a sol, more water than is necessary for hydrolysis is required herein. One can expect good results when there is used at least 2 moles of water and up to 100 moles of water per alkoxy group. Less than 1 equivalent of water per alkoxy group leads to insufficient hydrolysis of the lakoxy groups so that the sol and eventually unfired composite will contain significant levels of residual alkoxy groups which have been found to be detrimental in some formulations for some applications. Greater than 200 equivalents of water per equivalent of alkoxy does not appear to lead to any significant improvements in the composites.

To effect the hydrolysis, it has been found that solvents are helpful. For purposes of this invention, it has been found that the aqueous sols and water soluble or water miscible solvents are best. It is preferred to use water soluble or water miscible alcohols herein or mixtures of such alcohols. Especially suitable are methanol, ethanol, propanol and butanol and lower molecular weight ether alcohols such as ethylene glycol monomethyl ether. Sometimes it may be beneficial to include small amounts of other organic solvents such as xylene or toluene, for example, up to 5 weight percent of the total solvents in the sol.

The hydrolysis reactions generally require the use of an acidic pH in order to maintain the stability of the sol and it is recommended that the hydrolysis reaction and the final sol be maintained at an acid pH.

The sols of this invention contain from about 10 to 70 percent solids, preferably 30 to 50 percent solids, based on the weight of silsesquioxanes, oxides (if present), solvent and water present in the sol. The percent solids in the sols can be varied as desired by either the addition of solvent or the removal of solvent by stripping. The amount of metal oxide present in either sol (ii) or (iii) should be less than about 80 weight percent and preferably less than 50 weight percent based on the weight of the solid materials in the sol. The amount of added organic solvent in the sol can vary from 0 to 60 weight percent based on the weight of the solvent and the water present in the sol.

Conventional silanol condensation catalyst may be added to the sols of this invention prior to the impregnation step if desired. Such catalysts are well known in the art.

The sol is used in step (A) of the method of this invention. It is preferred that freshly-prepared sols be used in this invention since "aged" sols may have a tendency to reduce flowability in the pressing step of this invention. Generally, the sols should be used within a few days if storage is at room temperature. Low temperature storage will allow for longer storage times before a sol is considered "aged".

The desired fiber is impregnated with the sol solution by any convenient means. The fiber may, if desired, be cleaned of sizing or other surface treatments as described above, prior to impregnation. The strands of fiber or the woven fabric can be immersed in the sol solution and drained of excess sol. The fibers can be wound on drums or spools and wetted with the sol. Other impregnation methods may be used.

Generally, it is advantageous to treat the fibers before impregnating them in order to enhance the adhesion of the matrix material or gel to the fibers. As mentioned above, this is easily accomplished by treating the fibers with known adhesion promoting materials such as are common in the glass composite industry. After the fibers are treated in this manner, they are air dried and impregnated with the sol.

After the excess sol has drained from the fibers, the product is dried. This is easily accomplished by allowing the impregnated fiber to stand at room temperature. This dried, impregnated fibers are commonly referred to as a "prepreg". The dried, impregnated fiber is then heated at an elevated temperature, on the order of 50° to 150° C. for several minutes to several hours. It has been found that heating at 100° C. for 10–15 minutes is generally sufficient. This heating step, also referred to as B-staging, which partially cures the resins, can be easily carried out in an air convection oven or similar equipment. Care should be taken to avoid temperature and time period combinations which result in excessive curing such that flowability of the resin in the later molding step is significantly reduced. The product or prepreg at this point is dry and easily handleable.

The prepreg is then pressed in order to form the composite into the desired shape and to cause uniformity of the resin matrix around the fibers. The pressing takes place at a temperature of about 100° to 300° C. for a few minutes to several hours. The externally applied pressure is on the order of a few pounds per square inch to 2500 psi. The temperature, time duration, and pressure should be selected so that the resin will flow throughout the mold. It has been found that pressing at about 175° C. for one-half hour at a pressure of about 2000 psi generally gives satisfactory results. Pressing at pressures less than 1000 psi also gives satisfactory results. Care should be taken to avoid temperatures and pressures such that the resin is forced out of the mold. In general, the actual pressure is not a critical parameter in the pressing step. The pressed composite is then further cured at a temperature not greater than 300° C. to insure complete or nearly complete cross-linking in a post curing step. A preferred schedule for post-curing has been found to be about 8 hours at 100° C. followed by 16 hours at 250° C. Other post-curing schedules can be used so long as the composite undergoes nearly complete or complete cross-linking and the temperature does not exceed 300° C. This post-curing can take place either in the mold with applied pressure or in a conventional oven or similar device without any applied pressure.

The pressed and cured product (the green composite) is then slowly fired in a furnace to a temperature of at least 1000° C. in an inert atmosphere or vacuum until the product ceramifies. It is preferred that the green composite be fired at a temperature of about 1200° C. By slow firing, it is meant that the composites are heated in a slow, stepwise fashion until the majority of any higher boiling volatiles present escape the composite after which time the temperature can be quickly raised to the ultimate firing temperature. For example, the temperature for most composites should be raised to about 300° C. and the heating slowly continued until a temperature of about 600° C. is reached and then the temperature can be raised rather quickly to the ultimate firing temperature. The effect that needs to be accomplished is the removal of the greater portion of any volatiles that are in the composite. For most composites, this occurs over about a 300° C. heating range and for the majority of composites prepared from the sols of this process, this range is 300° C. to 600° C. In order to establish the range for any given formulation, one can run a thermogravimetric analysis on the material to determine the temperature range at which the majority of volatiles are removed.

After completion of the firing process the composite is cooled. At least the initial cooling should also be under an inert atmosphere or vacuum. When cooled, the resulting material is a uniform, hard, strong fiber reinforced glass composite. The composites of this invention can have the volume percentage of fibers in the composites varying over a wide range depending upon the desired use. For most composites it is preferred that the composites have between 30 and 50 volume percent fibers.

Also contemplated within the scope of this invention is the repeat of steps A, B, E, F and G of this invention on the already formed and fired fiber reinforced glass composites of this invention. Thus, it is within the scope of this invention to obtain a fiber reinforced composite from steps A through G of this invention and subject the fired composite to re-impregnation, drying, curing and firing. This repetition on an already fired composite allows one to raise the density (and consequently the physical strength) of the final composite. It is within the scope of this invention to repeat the steps A, B, E, F, and G, for a fired composite, multiple times in order to reach a high density, high strength product.

The following examples are intended to illustrate the invention and should not be construed to limit the claims as set forth herein.

Test Procedures

Modulus of Rupture (MOR): The modulus of rupture or flexural strength was determined using ASTM D-790 procedure. Flexural test speciments were approximately 6.5 cm×1.0 cm×0.15 cm with specimen length parallel to the fiber axis. Load versus crosshead travel was measured in a three-point bending mode on a universal testing machine manufactured by the Instron Corporation, Canton, Mass. U.S.A. The machine had 3/8 in. diameter sapphire loading pins at a span of 2 in. The loading rate was 0.2 in./min. The span to thickness ratio (S/T, where S is the span on the testing machine and T is the sample thickness) was generally between 20 and 50.

EXAMPLE 1

A sol was prepared by combining 26.9 grams of phenyltrimethoxysilane, 35.8 grams of methyltrimethoxysilane and 44.5 grams of Nalcoag 1041 colloidal silica (34 weight percent solids) in a round bottomed glass flask, with stirring. After stirring for approximately five to ten minutes, the mixture became a homogeneous transparent liquid. The resulting sol contained $CH_3SiO_{3/2}$, $C_6H_5SiO_{3/2}$ and $SiO_2$ in a 35/35/30 weight ratio with about 45 weight percent solids. A bundle of Celanese Celion carbon fiber was prepared by wrapping the carbon fiber around a fourteen inch span 40 times. The epoxy sizing on the fibers was removed, first by soaking the fiber bundle in acetone for three hours and then drying and heat treating the bundle by passing the bundle through a Bunsen burner flame until the fibers appeared fluffy. The bundle was then soaked in a methanol solution containing 0.05 weight percent of 3-glycidoxypropyltrimethoxysilane and 0.95 weight percent of Cymel 303. The fibers were then air-dried two hours at room temperature and then ten minutes at 110° C. in an air circulating oven. After cooling, the bundle was then soaked in the sol described above to which had been added a few dros of a silicone glycol surfactant of general formula

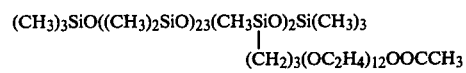

(10 weight percent in isopropanol). The bundle was allowed to air dry for one hour and then it was partially cured (B-staged) by heating the bundle for ten minutes at 110° C. in an oven. This provided a dried handleable fiber bundle. After cutting to lengths of about 3 inches the bundle of fibers (prepreg) was pressed in a stainless steel mold at 175° C. for 30 minutes under a pressure of 2000 psi. The mold was 3×5 in. with a internal cavity of about 3×0.5 in. A stainless steel plunger was inserted into the internal cavity on top of the prepreg. The final thickness of the pressed prepreg depends upon the amount of matrix and fibers used and the molding pressure. The pressed prepreg was then post-cured at 100° C. for eight hours and then 250° C. for sixteen hours. This material was then fired in an Astro Industries water cooled graphite resistance furnace (Model 1000.3060-FP-12) to 1200° C. under a nitrogen atmosphere. The sample was heated from 200° to 800° C. at a rate of about 2° C. per minute and from 800° to 1200° C. at a rate of about 20° C. per minute. The composite was held at 1200° for 12 minutes. The total firing time was about 5.5 hours. The fired composite had a sample size of 7.0×0.72×0.22 cm. The fiber volume fraction was 50% and the weight percent fiber was 59%. The fired composite had a bulk density of 1.4 g/cm³ and a flexural strength of 24,199 psi (measured at a span to thickness ratio, S/T, of 23).

EXAMPLE 2

A sol containing $C_6H_5SiO_{3/2}$, $CH_3SiO_{3/2}$, and $SiO_2$ in a 30/30/40 weight ratio was prepared using the same procedure as Example 1. A organosilsesquioxane/carbon fiber composite was prepared and fired as in Example 1. The fired composite had 68 weight percent fibers, 52 volume percent fiber, a bulk density of about 1.4 g/cm$^2$, and a flexural strength of 26,620 psi (S/T=33).

EXAMPLE 3

A composite sample was prepared from the sol prepared in Example 1 and silicon carbide fibers produced by the Nippon Carbon Company, Ltd. The procedure for preparing this silicon carbide fiber composite was the same as used in Example 1. The fired sample size was 6.13×1.19×0.08 cm; the volume percent fiber was 37%; weight percent fiber was 56%; the bulk density was 1.7 gm/cm$^3$; and the flexural strength was 27,681 psi (S/T=63).

EXAMPLE 4

Another silicon carbide fiber composite was prepared in the exact manner as Example 3 except that the prepreg was pressed at only a few pounds per square inch rather than the 2000 psi used in Example 3. Other than the mold pressure, the sample was prepared in the same manner using the same materials as in Example 3. The pressure on the prepreg of this Example in the pressing step was from the weight of the top portion of the mold (the stainless steel plunger) only as no external pressure was applied. This SiC fiber composite, after firing, contained 55 weight percent fibers and had a flexural strength of 13,865 psi (S/T=51).

EXAMPLE 5

A sol containing $C_6H_5SiO_{3/2}$, $CH_3SiO_{3/2}$, and $SiO_2$ in a weight ratio of 30/30/40 was prepared in the same manner as Example 1. A organosilsesquioxane resin/silicon carbide fiber composite was prepared and fired in the same manner as described in Example 3 except that the silicon glycol surfactant was not used in the impregnation step. The fired composite contained 54 weight percent fibers and had a flexural strength of 19,216 psi (S/T=67).

Coposites prepared with silicon carbide fibers as described in Examples 3, 4, and 5 showed excellent oxidation resistance. For example, silicon carbide composites prepared with a sol containing $CH_3SiO_{3/2}$, $C_6H_5SiO_{3/2}$, and $SiO_2$ in a 30/30/40 weight ratio showed virtually no change in flexural strength, as compared with similarly prepared controls, after exposure to air at temperatures of 500°–1000° C. for time periods of 12–20 hours. The weight loss of all composite tested under these air oxidation conditions was less than 6 weight percent in all cases.

EXAMPLE 6

A composite sample was prepared from a sol prepared by combining 30.4 grams of $CH_3Si(OCH_3)_3$, 23 grams of $C_6H_5Si(OCH_3)_3$ and 100 grams of a colloidal zirconia sol (20% solids). The colloidal zirconia sol was from Nyacol, Inc., Ashland, Mass., U.S.A. To this mixture was added 10 ml of acetic acid with stirring to bring the pH of the mixture to 3.5 whereupon the mixture cleared and became compatible. The resulting sol contained $CH_3SiO_{3/2}$, $C_6H_5SiO_{3/2}$, and $ZrO_2$ in a 30/30/40 weight ratio. After stirring for a few minutes, the sol was poured over a tow of Celion carbon fibers prepared as in Example 1 above. The impregnated bundle was air dried for one hour and then partially cured at 110° C. for ten minutes. This provided a dried, handleable fiber bundle or prepreg. The fiber bundle was then pressed at 175° C. or 30 minutes. The pressure was from the weight of the top portion of the mold as no additional pressure was applied. After cooling, the composite was removed from the press and post cured at 100° C. for eight hours and 250° C. for 16 hours to form a green (unfired) composite. The green composite was fired to 1200° C. under a nitrogen atmosphere as described in Example 1. The fired composite contained 75 weight percent fibers and had dimensions of 6.9 cm×1.2 cm×0.12 cm. The density of the composite was 1.3 g/cm$^3$. The flexural strength of the fired composite was 22,719 psi (S/T=42).

EXAMPLE 7

A composite sample was prepared from a sol prepared by combining 30.4 grams of $CH_3Si(OCH_3)_3$, 23 grams of $C_6H_5Si(OCH_3)_3$, and 100 grams colloidal alumina. The colloidal alumina from Nyacol, Inc. contained about 20 weight percent solids. The sol contained about 33 weight percent solid consisting of $CH_3SiO_{3/2}$, $C_6H_5SiO_{3/2}$, and $Al_2O_3$ in a 30/30/40 weight ratio. A bundle of carbon fibers was prepared by wrapping fibers around a 14 inch span 40 times and then soaking the bundle in acetone for three hours. After air drying the fiber bundle was passed through the flame of a Bunsen burner to remove any remaining finish or sizing. The cooled bundle was then impregnated with the above sol to which had been added a few drops of the silicone glycol surfactant described in Example 1. The impregnated bundle was air dried and then partially cured at 100° C. for ten minutes. The fiber bundle was pressed, post-cured, and fired under the same conditions as Example 1. The fired composite was 71 weight percent fiber and had a flexural strength of 9254 psi (S/T=28).

EXAMPLE 8

A sol was prepared by combining 16 grams phenyltrimethoxysilane, 21 grams methyltrimethoxysilane and 37 grams water to which was added about 15 drops acetic acid. The mixture was stirred for about ten minutes at which time it was homogeneous and transparent. The resulting sol contained $C_6H_5SiO_{3/2}$ and $CH_3SiO_{3/2}$ in about a 50/50 weight ratio with about 25 weight percent solids.

A carbon woven fabric (A-193P) from Hercules Incorporated, Magna, Utah, U.S.A. was employed to prepare a fiber reinforced glass composite. The carbon fabric was used as received. A 12 by 12 inch piece of the carbon fabric was soaked in the above described sol for 15 minutes and then air dried for one hour. The impregnated fabric was B-staged at 100° C. for 5 minutes. Eight pieces of the partially cured fabric, one atop of another, were pressed at 175° C. for 30 minutes at a pressure of 2000 psi. The pressed composite was post cured 8 hours at 100° C. and 16 hours at 250° C. The pressed and post cured composite, cut into 0.5 by 3 inch pieces, was fired to 1200° C. under nitrogen as described in Example 1. Three flexural strength measurements were made: 2978 psi (S/T=34), 2860 psi (S/T=17), and 2961 psi (S/T=17).

EXAMPLE 9

A carbon fabric reinforced glass composite was prepared exactly as described in Example 8 except that a conventional silanol condensation catalyst was added to the sol prior to the impregnation of the carbon fabric. The silanol condensation catalyst consisted of a mixture of about 0.1 percent by weight zinc octoate and 0.075 percent by weight trimethyl beta-hydroxy ethyl ammonium 2-ethyl hexoate where the percentages are based on the total weight of the impregnating sol. The following results were obtained: flexural strength of 4305 psi (S/T=34) and 3709 psi (S/T=18).

That which is claimed is:

1. A method of preparing fiber reinforced glass composites which method comprises
    (A) impregnating high modulus fibers with resin sol, which resin sol is selected from the group consisting essentially of
        (i) a sol of an organosilsesquioxane having the average formula $[C_6H_5SiO_{3/2}][RSiO_{3/2}]$ wherein $C_6H_5SiO_{3/2}$ is present in said organosilsesquioxane in the amount of 5 to 100 percent by weight and $RSiO_{3/2}$ is present in the amount of 0 to 95 percent by weight based on the total weight of organosilsesquioxane present, and where R is an alkyl radical containing from 1 to 4 carbon atoms;
        (ii) a mixture of a sol of the organosilsesquioxane from (i) and a colloidal metal oxide, or a mixture of colloidal metal oxides, selected from the group consisting of $SiO_2$, $Al_2O_3$, $ZrO_2$, $TiO_2$, $SnO_2$, $ZrSiO_4$, $B_2O_3$, $La_2O_3$, $Sb_2O_5$; wherein $C_6H_5SiO_{3/2}$ is present in said organosilsesquioxane in the amount of 5 to 90 percent by weight and $RSiO_{3/2}$ is present in the amount of 10 to 95 percent by weight based on the total weight of organosilsesquioxane present; and
        (iii) a mixture of a sol of the organosilsesquioxane from (i) and a metal alkoxide, or a mixture of metal alkoxides, having the general formula $M(OR')_x$ wherein M is a metal atom, R' is an alkyl radical containing from 1 to 4 carbon atoms, and x is 3 or 4, which metal alkoxide is capable of hydrolyzing and condensing in water; wherein $C_6H_5SiO_{3/2}$ is present in the amount of 5 to 90 percent by weight and $RSiO_{3/2}$ is present in the amount of 10 to 95 percent by weight based on the total weight of organosilsesquioxane present;
    (B) forming a prepreg by drying the product from (A);
    (C) heating the prepreg of (B) at an elevated temperature for a time sufficient to effect partial curing but to avoid excessive curing of the resin;
    (D) pressing the prepreg from (C) at a temperature not greater than about 300° C.;
    (E) curing the pressed prepreg from (D) at a temperature not greater than about 300° C. for a time sufficient to insure complete or nearly complete crosslinking in the prepreg;
    (F) slowly firing the pressed and cured prepreg from (E) to a temperature of at least 1000° C. in an inert atmosphere or vacuum until a fiber reinforced glass composite is obtained; and
    (G) cooling the fiber reinforced glass composite.

2. A method as described in claim 1 wherein said high modulus fibers are selected from the group consisting of carbon fibers and silicon carbide fibers.

3. A method as described in claim 2 wherein said fibers are essentially unidirectional and continuous.

4. A method as described in claim 3 wherein said fibers form a woven fabric.

5. A method as described in claim 2 wherein said resin sol is (i), wherein $C_6H_5SiO_{3/2}$ is present in said organosilsesquioxane in the amount of 30 to 70 percent by weight and $RSiO_{3/2}$ is present in the amount of 30 to 70 percent by weight based on the total weight of organosilsesquioxane present, and where R is a methyl radical.

6. A method as described in claim 3 wherein said resin sol is (i), wherein $C_6H_5SiO_{3/2}$ is present in said organosilsesquioxane in the amount of 30 to 70 percent by weight and $RSiO_{3/2}$ is present in the amount of 30 to 70 percent by weight based on the total weight of organosilsesquioxane present, and where R is a methyl radical.

7. A method as described in claim 4 wherein said resin sol is (i), wherein $C_6H_5SiO_{3/2}$ is present in said organosilsesquioxane in the amount of 30 to 70 percent by weight and $RSiO_{3/2}$ is present in the amount of 30 to 70 percent by weight based on the total weight of organosilsesquioxane present, and where R is a methyl radical.

8. A method as described in claim 2 wherein said resin sol is (ii), wherein $C_6H_5SiO_{3/2}$ is present in said organosilsesquioxane in the amount of 30 to 70 percent by weight and $RSiO_{3/2}$ is present in the amount of 30 to 70 percent by weight based on the total weight of organosilsesquioxane present, and where R is a methyl radical.

9. A method as described in claim 3 wherein said resin sol is (ii), wherein $C_6H_5SiO_{3/2}$ is present in said organosilsesquioxane in the amount of 30 to 70 percent by weight and $RSiO_{3/2}$ is present in the amount of 30 to 70 percent by weight based on the total weight of organosilsesquioxane present, and where R is a methyl radical.

10. A method as described in claim 4 wherein said resin sol is (ii), wherein $C_6H_5SiO_{3/2}$ is present in said organosilsesquioxane in the amount of 30 to 70 percent by weight and $RSiO_{3/2}$ is present in the amount of 30 to 70 percent by weight based on the total weight of organosilsesquioxane present, and where R is a methyl radical.

11. A method as described in claim 2 wherein said resin sol is (ii) and wherein said colloidal metal oxide, or mixture of said colloidal metal oxides, is selected from the group consisting of $SiO_2$, $TiO_2$, $Al_2O_3$, $ZrO_2$, and $ZrSiO_4$.

12. A method as described in claim 8 wherein said colloidal metal oxide, or mixture of said colloidal metal oxides, is selected from the group consisting of $SiO_2$, $TiO_2$, $Al_2O_3$, $ZrO_2$, and $ZrSiO_4$.

13. A method as described in claim 9 wherein said colloidal metal oxide, or mixture of said colloidal metal oxides, is selected from the group consisting of $SiO_2$, $TiO_2$, $Al_2O_3$, $ZrO_2$, and $ZrSiO_4$.

14. A method as described in claim 10 wherein said colloidal metal oxide, or mixture of said colloidal metal oxides, is selected from the group consisting of SiO$_2$, TiO$_2$, Al$_2$O$_3$, ZrO$_2$, and ZrSiO$_4$.

15. A method as described in claim 13 wherein said colloidal metal oxide is SiO$_2$.

16. A method as described in claim 14 wherein said colloidal metal oxide is SiO$_2$.

17. A method as described in claim 13 wherein said colloidal metal oxide is Al$_2$O$_3$.

18. A method as described in claim 14 wherein said colloidal metal oxide is Al$_2$O$_3$.

19. A method as described in claim 13 wherein said colloidal metal oxide is ZrO$_2$.

20. A method as described in claim 14 wherein said colloidal metal oxide is ZrO$_2$.

21. A method as described in claim 2 wherein said resin sol is (iii), wherein C$_6$H$_5$SiO$_{3/2}$ is present in said organosilsesquioxane in the amount of 30 to 70 percent by weight and RSiO$_{3/2}$ is present in the amount of 30 to 70 percent by weight based on the total weight of organosilsesquioxane present, and where R is a methyl radical.

22. A method as described in claim 3 wherein said resin sol is (iii), wherein C$_6$H$_5$SiO$_{3/2}$ is present in said organosilsesquioxane in the amount of 30 to 70 percent by weight and RSiO$_{3/2}$ is present in the amount of 30 to 70 percent by weight based on the total weight of organosilsesquioxane present, and where R is a methyl radical.

23. A method as described in claim 4 wherein said resin sol is (iii), wherein C$_6$H$_5$SiO$_{3/2}$ is present in said organosilsesquioxane in the amount of 30 to 70 percent by weight and RSiO$_{3/2}$ is present in the amount of 30 to 70 percent by weight based on the total weight of organosilsesquioxane present, and where R is a methyl radical.

24. A method as described in claim 21 wherein M(OR')$_x$ is selected from the group consisting of Si(OR')$_4$, Ti(OR')$_4$, Al(OR')$_3$, Zr(OR')$_4$, and Sn(OR')$_4$.

25. A method as described in claim 22 wherein M(OR')$_x$ is selected from the group consisting of Si(OR')$_4$, Ti(OR')$_4$, Al(OR')$_3$, Zr(OR')$_4$, and Sn(OR')$_4$.

26. A method as described in claim 23 wherein M(OR')$_x$ is selected from the group consisting of Si(OR')$_4$, Ti(OR')$_4$, Al(OR')$_3$, Zr(OR')$_4$, and Sn(OR')$_4$.

27. A method as described in claim 2 wherein the prepreg of step (B) is heated at a temperature of 50°–150° C. in step (C) for a time sufficient to effect partial curing but to avoid excessive curing of the resin; and wherein the prepreg from (C) is pressed in step (D) at a temperature of 100° to 300° C.

28. A method as described in claim 3 wherein the prepreg of step (B) is heated at a temperature of 50°–150° C. in step (C) for a time sufficient to effect partial curing but to avoid excessive curing of the resin; and wherein the prepreg from (C) is pressed in step (D) at a temperature of 100° to 300° C.

29. A method as described in claim 4 wherein the prepreg of step (B) is heated at a temperature of 50°–150° C. in step (C) for a time sufficient to effect partial curing but to avoid excessive curing of the resin; and wherein the prepreg from (C) is pressed in step (D) at a temperature of 100° to 300° C.

30. A method as described in claim 5 wherein the prepreg of step (B) is heated at a temperature of 50°–150° C. in step (C) for a time sufficient to effect partial curing but to avoid excessive curing of the resin; and wherein the prepreg from (C) is pressed in step (D) at a temperature of 100° to 300° C.

31. A method as described in claim 8 wherein the prepreg of step (B) is heated at a temperature of 50°–150° C. in step (C) for a time sufficient to effect partial curing but to avoid excessive curing of the resin; and wherein the prepreg from (C) is pressed in step (D) at a temperature of 100° to 300° C.

32. A method as described in claim 11 wherein the prepreg of step (B) is heated at a temperature of 50°–150° C. in step (C) for a time sufficient to effect partial curing but to avoid excessive curing of the resin; and wherein the prepreg from (C) is pressed in step (D) at a temperature of 100° to 300° C.

33. A method as described in claim 21 wherein the prepreg of step (B) is heated at a temperature of 50°–150° C. in step (C) for a time sufficient to effect partial curing but to avoid excessive curing of the resin; and wherein the prepreg from (C) is pressed in step (D) at a temperature of 100° to 300° C.

34. A method as described in claim 24 wherein the prepreg of step (B) is heated at a temperature of 50°–150° C. in step (C) for a time sufficient to effect partial curing but to avoid excessive curing of the resin; and wherein the prepreg from (C) is pressed in step (D) at a temperature of 100° to 300° C.

35. A method as described in claim 2 wherein said resin sol is (i) and wherein said organosilsesquioxane has the general formula C$_6$H$_5$SiO$_{3/2}$.

36. A method as described in claim 2 wherein said resin sol is (i) and wherein said organosilsesquioxane has the general formula

[C$_6$H$_5$SiO$_{3/2}$][RSiO$_{3/2}$]

wherein C$_6$H$_5$SiO$_{3/2}$ is present in said organosilsesquioxane in the amount of 5 to 99 percent by weight and RSiO$_{3/2}$ is present in the amount of 1 to 95 percent by weight based on the total weight of organosilsesquioxane present, and where R is an alkyl radical containing from 1 to 4 carbon atoms.

37. A method of preparing fiber reinforced glass composites which method comprises
(A) impregnating high modulus fibers with a resin sol, which high modulus fibers are selected from the group consisting of carbon fibers and silicon carbide fibers and which resin sol is selected from the group consisting essentially of
  (i) a sol of an organosilsesquioxane having the average formula

[C$_6$H$_5$SiO$_{3/2}$][CH$_3$SiO$_{3/2}$]

wherein C$_6$H$_5$SiO$_{3/2}$ is present in said organosilsesquioxane in the amount of 30 to 60 percent by weight and CH$_3$SiO$_{3/2}$ is present in the amount of 30 to 60 percent by weight based on the total weight of organosilsesquioxane present;
  (ii) a mixture of a sol of the organosilsesquioxane from (i) and a colloidal metal oxide, or a mixture of colloidal metal oxides, selected from the group consisting of SiO$_2$, Al$_2$O$_3$, ZrO$_2$, TiO$_2$, and ZrSiO$_4$;
  (iii) a mixture of a sol of the organosilsesquioxane from (i) and a metal alkoxide, or mixture of metal alkoxides, selected from the group consisting of Si(OR')$_4$, Ti(OR')$_4$, Al(OR')$_3$, Zr(OR')$_4$, and Sn(OR')$_4$;
(B) forming a prepreg by drying the product from (A);

(C) heating the prepreg of (B) at a temperature of 50° to 150° C. for a time sufficient to effect partial curing but to avoid excessive curing of the resin;

(D) pressing the prepreg from (C) at a temperature of 100° to 300° C.;

(E) curing the pressed prepreg from (D) at a temperature not greater than about 300° C. for a time sufficient to insure complete or nearly complete cross-linking in the prepreg;

(F) slowing firing the pressed and cured prepreg from (E) to a temperature of at least 1000° C. in an inert atmospheric or vacuum until a fiber reinforced glass composite is obtained; and (G) cooling the fiber reinforced glass composite.

38. A method as described in claim 37 wherein said resin sol is (i) and said resin sol contains from 30 to 50 percent by weight solids based on the total weight of the sol.

39. A method as described in claim 37 wherein said resin sols is (ii), said resin sol contains from 30 to 50 percent by weight solids based on the total weight of the sol, and the amount of metal oxides present is less than 50 percent by weight of the total solids in the sol.

40. A method as described in claim 37 wherein said resin sol is (iii), said resin sol contains from 30 to 50 percent by weight based on the total weight of the sol, and the amount of solids present from the metal alkoxides is less than 50 percent by weight of the total solids in the sol.

41. A method as described in claim 37 wherein the pressed and cured prepreg from (E) is slowly fired in Step (F) to a temperature of about 1200° C.

42. A method as described in claim 38 wherein the pressed and cured prepreg from (E) is slowly fired in Step (F) to a temperature of about 1200° C.

43. A method as described in claim 39 wherein the pressed and cured prepreg from (E) is slowly fired in Step (F) to a temperature of about 1200° C.

44. A method as described in claim 40 wherein the pressed and cured prepreg from (E) is slowly fired in Step (F) to a temperature of about 1200° C.

45. A fiber reinforced glass composite prepared by the method of claim 1.

46. A fiber reinforced glass composite prepared by the method of claim 2.

47. A fiber reinforced glass composite prepared by the method of claim 3.

48. A fiber reinforced glass composite prepared by the method of claim 4.

49. A fiber reinforced glass composite prepared by the method of claim 5.

50. A fiber reinforced glass composite prepared by the method of claim 8.

51. A fiber reinforced glass composite prepared by the method of claim 11.

52. A fiber reinforced glass composite prepared by the method of claim 21.

53. A fiber reinforced glass composite prepared by the method of claim 24.

54. A fiber reinforced glass composite prepared by the method of claim 37.

55. A fiber reinforced glass composite prepared by the method of claim 38.

56. A fiber reinforced glass composite prepared by the method of claim 39.

57. A fiber reinforced glass composite prepared by the method of claim 40.

58. A method as described in claim 2 wherein the fiber reinforced glass composite of step (G) is subjected to steps (A), (B), (E), (F), and (G) one or more times.

59. A method as described in claim 3 wherein the fiber reinforced glass composite of step (G) is subjected to steps (A), (B), (E), (F), and (G) one or more times.

60. A method as described in claim 4 wherein the fiber reinforced glass composite of step (G) is subjected to steps (A), (B), (E), (F), and (G) one or more times.

61. A method as described in claim 5 wherein the fiber reinforced glass composite of step (G) is subjected to steps (A), (B), (E), (F), and (G) one or more times.

62. A method as described in claim 8 wherein the fiber reinforced glass composite of step (G) is subjected to steps (A), (B), (E), (F), and (G) one or more times.

63. A method as described in claim 11 wherein the fiber reinforced glass composite of step (G) is subjected to steps (A), (B), (E), (F), and (G) one or more times.

64. A method as described in claim 38 wherein the fiber reinforced glass composite of step (G) is subjected to steps (A), (B), (E), (F), and (G) one or more times.

65. A fiber reinforced glass composite prepared by the method of claim 58.

66. A fiber reinforced glass composite prepared by the method of claim 59.

67. A fiber reinforced glass composite prepared by the method of claim 60.

68. A fiber reinforced glass composite prepared by the method of claim 61.

69. A fiber reinforced glass composite prepared by the method of claim 62.

70. A fiber reinforced glass composite prepared by the method of claim 63.

71. A fiber reinforced glass composite prepared by the method of claim 64.

* * * * *